Nov. 11, 1952     N. H. CALKINS     2,617,626
CAM ACTUATED DIAPHRAGM SEALED VALVE
Filed June 8, 1948     2 SHEETS—SHEET 1
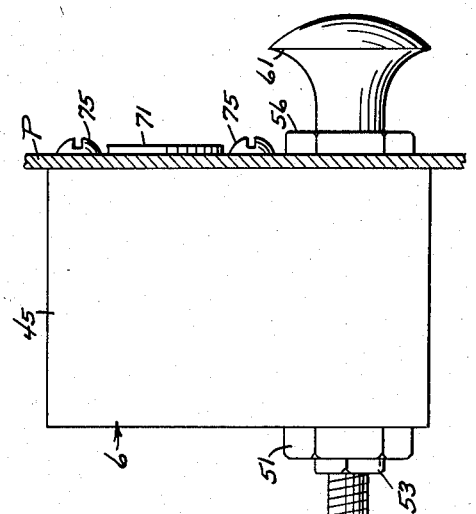
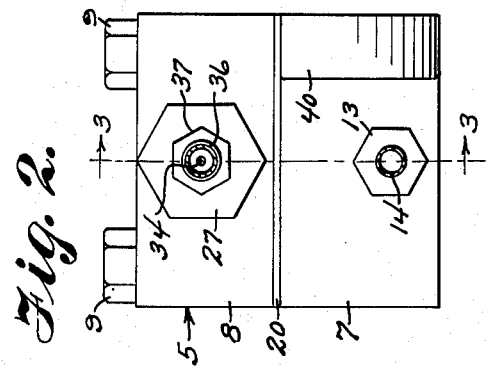
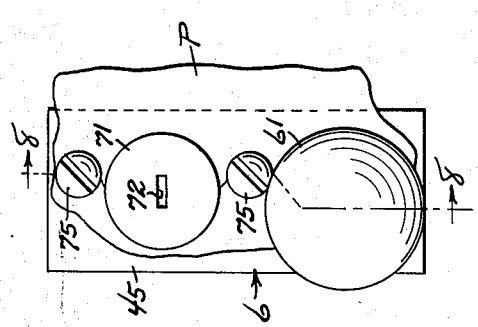
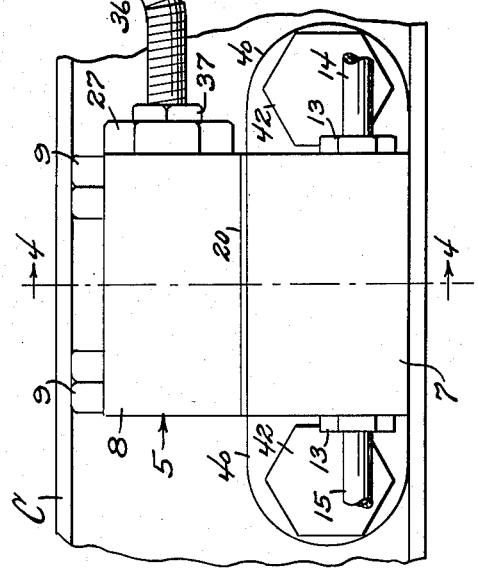
INVENTOR.
Neil H. Calkins
BY *Victor J. Evans & Co.*
ATTORNEYS

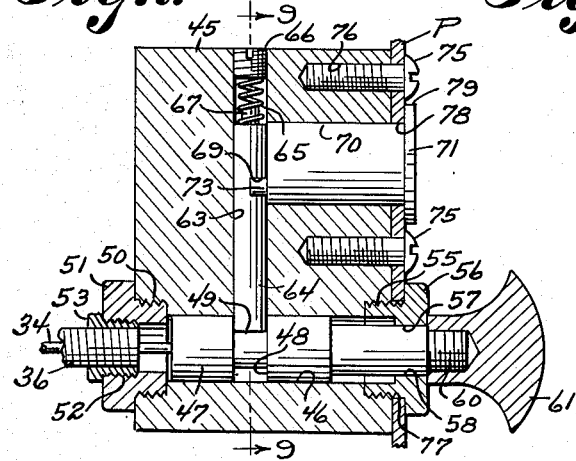

Patented Nov. 11, 1952

2,617,626

UNITED STATES PATENT OFFICE 2,617,626

CAM ACTUATED DIAPHRAGM SEALED VALVE

Neil H. Calkins, Merchantville, N. J.

Application June 8, 1948, Serial No. 31,790

1 Claim. (Cl. 251—132)

The present invention relates to improvements in anti-theft devices for motor vehicles, and in particular to a lock controlled valve for cutting off the supply of fuel to the engine of the motor vehicle so that unauthorized persons will be prevented from operating the vehicle when the same is left unattended.

The primary object of the invention is to provide a valve for interposition in the gasoline supply line of an internal combustion engine of a motor vehicle which can be locked from a remote point such as from a position adjacent the driver's seat on the dash panel of the vehicle to prevent unauthorized persons from operating the motor vehicle.

Another object is to provide a lock controlled valve interposed in the gasoline supply line of a motor vehicle power plant which is controlled from a position adjacent the driver's seat of the vehicle by a flexible cable such that ease of operation is facilitated without necessitating the driver leaving his seat.

Another object is to provide a lock controlled valve which is provided with a flexible diaphragm sealing device formed of neoprene or other synthetic rubber composition to prevent leakage of fuel around the valve by deterioration of the sealing element under the attack of the liquid fuel.

Another object is to provide a lock controlled valve for interposition in the fuel supply line of a vehicle motor which is controlled from a remote location by a flexible cable which is enclosed in a protective sheath and so located as to prevent tampering by unauthorized persons.

Other objects and advantages of the invention will become apparent during the course of the following description of the accompanying drawings, wherein:

Figure 1 is a schematic view showing the control valve and lock in side elevation with the control lock connected to the valve actuating member by means of a flexible cable enclosed in a protective sheath.

Figure 2 is an end elevational view of the control valve.

Figure 3 is a vertical cross-sectional view taken on line 3—3 of Figure 2 looking in the direction of the arrows to illustrate various structural details of the control valve and its sliding actuator.

Figure 4 is a transverse vertical cross-sectional view taken on line 4—4 of Figure 1 and looking in the direction of the arrows to show the manner in which the flexible sealing diaphragm is arranged for movably supporting the reciprocating control valve.

Figure 5 is a vertical longitudinal cross-sectional view similar to Figure 3, but showing the valve in its closed position.

Figure 6 is a plan view of the sealing diaphragm showing the same removed from the valve body.

Figure 7 is a fragmentary front elevational view of the valve actuating handle, and the lock structure for rendering the same inoperative.

Figure 8 is a vertical cross-sectional view taken on line 8—8 of Figure 7 and looking in the direction of the arrows to illustrate the manner in which the remote control handle is locked against longitudinal movement to hold the valve in a closed position, and Figure 9 is a vertical cross-sectional view taken on line 9—9 of Figure 8 to further show various details of construction.

In the drawings, referring more in detail, there is shown in Figure 1 a control valve generally designated 5, and a combined remote control and lock generally designated 6.

The control valve 5 is comprised of separably connected body portions 7 and 8 which are adapted to be connected by machine screws or bolts 9. The bolts 9 being received in threaded bores 10 adjacent the corners of the valve body section 7.

The valve body sections 7 and 8 are of rectangular shape, and the section 7 is provided with a bore 11 terminating at its ends in enlarged threaded bores 12 for receiving the threaded portions of pipe nipples 13. The gasoline fuel supply pipe 14 being connected to one of the threaded coupling nipples 13, and the supply pipe 15 to the carburetor of the internal combustion engine being secured in place by the other threaded coupling nipple 13. Thus, the valve casing section 7 may be interposed in the fuel line of a motor vehicle, not shown, at a convenient location and preferably at a point below the driver's seat of the vehicle. Extending into the upper portion of the valve body section 7 is an enlarged bore 16 which is reduced to provide a relatively small bore 17 communicating with the fuel passage 11, Figures 3 and 4, for receiving a reciprocable valve plug 18. The valve plug is formed of neoprene or other synthetic rubber composition and is of round section to slide freely within the bore 17 and thus extend across the fuel passageway 11 and close off fuel passage from the supply pipe 14 to the pipeline 15.

Formed integral with the upper portion of the valve plug 18 is a flexible diaphragm 20 which is provided adjacent its corners with openings 21 for permitting passage of the bolts 9 and to securely clamp the sealing diaphragm 20 therebetween. An annular rib 22 having an annular recess is formed in the sealing diaphragm 20 to permit flexibility thereof and enable the reciprocating valve plug 18 to slide to and fro within the valve bore 17. A tapered coil spring 23 is received in the enlarged bore 16 of the valve body section 7 and has one end resting on the floor thereof, while the reduced end rests on the diaphragm adjacent an annular groove 24 formed in the flexible diaphragm 20 within the confines of the annular rib 22. Thus, the reciprocating valve plug 18 is normally held in an open position as shown in Figure 3.

The valve body section 8 is provided with a horizontal bore 25 which extends inwardly from one wall thereof, and terminates a short distance from the opposite wall. The bore 25 is enlarged and threaded as at 26 for receiving a nut 27. Communicating with the bore 25 is a transverse bore 28 into which a projection 29 on the valve plug 18 extends. The projection 29 is reduced in diameter and is adapted to receive a round cap 30 formed of hard rubber or similar composition, and the upper wall of the cap is cut away to provide an inclined cam surface 31.

Slidably mounted within the bore 25 is a piston-like actuator 32 having a spherical end portion 33 which is adapted to engage the inclined surface 31 of the hard rubber composition cap 30 so as to move the valve plug 18 downwardly when the piston-like member 32 is moved to the left as shown in Figure 5. A flexible actuator cable 34 has one end anchored in the piston-like member 32 as at 35, and said flexible cable 34 extends through a flexible sheathing 36 which is anchored in the nut 27 by means of a clamping nut 37. The clamping nut 37 is provided with a reduced portion which is threaded for being received in a correspondingly threaded opening 38 in the gland nut 27.

Formed integral with the valve body section 7 is a pair of ears or lugs 40 having openings 41 for receiving anchoring bolts 42, Figure 1, to securely fasten the valve body 5 to the chassis C of a motor vehicle. As mentioned previously the valve body 5 may be fastened in a convenient location to the chassis C of the motor vehicle to enable the fuel supply line to be interrupted for the interposition of the valve 5.

Reverting back to Figure 1, the combined manual actuator and lock 6 includes a casing 45 of block-like form, and the lower portion is provided with a horizontal bore 46, Figures 8 and 9 for slidably receiving a plunger 47. An annular groove 48 is formed in the plunger 47 to provide an intermediate reduced portion 49. One end of the bore 46 is enlarged and threaded as at 50 for receiving a nut 51 of a threaded bore 52 so that the flexible cable 34 may pass into the bore 46 and be anchored to the plunger 47 by means of a threaded connection therewith or other suitable anchoring means. The protective flexible sheathing 36 is anchored to the nut 51 by means of a clamping nut 53 which is threaded exteriorly corresponding to the threaded bore 52. The other end of the bore 46 is similarly enlarged as at 55, and is threaded for receiving a threaded guide bushing 56 having a bore 57 for slidably receiving and guiding a reduced portion 58 of the plunger 47 as shown in Figure 8. The free end of the extension 58 is further reduced in diameter and threaded as at 60 for receiving a manual control knob 61.

Extending through the block-like housing 45 normal to the bore 46 is a bore 63 for slidably receiving a spring projected bolt 64 which is adapted to project into the bore 46 and engage within the annular groove 48 of the actuator plunger 47. Also mounted in the bore 63 is a coil spring 65 which has one end arranged in abutting relation with a removable threaded plug 66 at its opposite end received on a projection 67 at the upper end of the locking bolt 64 to hold the spring in engagement with the upper end of said bolt. A notch 69 is formed in the locking bolt 64 intermediate its ends.

Extending parallel with the bore 46 and into the front wall of the casing is a bore 70 for receiving a cylinder lock 71 having a keyhole slot 72 for receiving a key to facilitate rotation of the barrel of said lock 71, not shown, which is fitted with an operating pin 73, Figure 8, for reception in the transverse notch 69 of the bolt 64. Thus, by rotating the key, not shown, the projection 73 will operate in the notch 69 since the same is eccentrically mounted to retract the bolt 64 against the yielding action of the coil spring 65.

As shown in Figures 1 and 8, the combined actuator and lock casing 6 is fastened to a dash board panel P of a motor vehicle by means of anchoring screws 75 which pass through suitable apertures in the panel P, and are received in correspondingly threaded bores 76 extending inwardly from the face of the casing 6. When the casing 6 is mounted, the handle 61 and nut 56 will be removed so that the projection 58 may pass through an opening 77 in the panel with the guide bushing 56 retaining the casing 6 in place on the panel, as well as forming a guide for the reduced portion 58 of the plunger 47. Similarly, during mounting the cylinder lock 71 may be removed from the bore 70 and passed through an opening 78 in the panel P so that the flange 79 on the cylinder lock 71 will overlap the opening 78 and assist in retaining the combined control and lock casing 6 in place.

For consideration of the operation, it will be assumed that the valve 5 is installed as above explained on the chassis C, and is interposed in the fuel supply line 14—15, and also, that the actuator and lock casing 6 has been installed on the instrument panel P so that the actuator handle 61 is within easy reach of the operator. When the driver or operator desires to park his car unattended, he pushes the knob 61 so as to operate the flexible cable 34, and thus force the piston-like member 32 to the left from the position shown in Figure 3 to that shown in Figure 5. When the plunger 47 is thus moved the bolt 64 will be projected into the annular groove 48 so as to lock the control knob 61 against unauthorized movement. Simultaneously the valve plug 18 is moved to a position to close the fuel passageway 11 and thus prevent operation of the vehicle by unauthorized persons.

When it is desired to unlock the control 61, a key is inserted in the lock 71 so as to turn the barrel thereof and the pin 73 whereby the locking bolt 64 will be moved to an inoperative position against the yielding action of the coil spring 65, and will permit the plunger 47 to be moved outwardly by the manual control knob 61 so as to displace the piston-like member 32 and allow the valve 18 to be moved to an inoperative position under the influence of the yielding action of the coil spring 23.

It is to be understood that the form of the invention herewith shown and described is to be taken as a preferred embodiment of the invention, and that various changes in the shape, size and arrangement of parts may be resorted to without departing from the spirit of the invention or the scope of the subjoined claim.

I claim:

In a lock-controlled valve for cutting off the supply of fluid to a vehicle engine, a valve casing having a fluid passageway, a reciprocatory rubber plug valve mounted in said casing and arranged to close said fluid passageway, spring means for normally holding said plug valve in an open position, a sliding operating plunger mounted in said casing for moving said plug valve to a closed position, said plunger being provided with a spherical end portion, said plunger extending in a plane at right angles to the axis of the valve plug and having the spherical end portion thereof engaging one end of the valve plug, a flexible sealing diaphragm formed on the plug valve integral therewith and having an annular recess for permitting flexing of said diaphragm when the plug valve is operated by said operating plunger, a projection on said diaphragm centrally thereof and extending outwardly thereof in axial alignment with said plug valve and a cap member on said projection and projecting from said plug valve and having an inclined surface adapted to be engaged by the spherical end portion of said operating plunger.

NEIL H. CALKINS.

REFERENCES CITED

The following references are of record in the file of this patent:

UNITED STATES PATENTS

| Number | Name | Date |
| --- | --- | --- |
| 1,000,523 | Illsley | Aug. 15, 1911 |
| 1,153,189 | Blything | Sept. 14, 1915 |
| 1,157,929 | Dugan | Oct. 26, 1915 |
| 1,237,144 | Allen | Aug. 14, 1917 |
| 1,270,911 | Woods | July 2, 1918 |
| 1,384,697 | Hissong | July 12, 1921 |
| 1,494,910 | Hench | May 20, 1924 |
| 1,572,947 | Pardoe | Feb. 16, 1926 |
| 1,672,366 | Cadwell | June 5, 1928 |
| 1,804,659 | Tice | May 12, 1931 |
| 2,027,190 | Miner | Jan. 7, 1936 |
| 2,187,652 | Jennings | Jan. 16, 1940 |
| 2,378,613 | Young | June 19, 1945 |

FOREIGN PATENTS

| Number | Country | Date |
| --- | --- | --- |
| 15,768 | Australia | of 1928 |
| 359,315 | Great Britain | of 1931 |